United States Patent
Mutter et al.

(10) Patent No.: US 11,722,335 B2
(45) Date of Patent: Aug. 8, 2023

(54) USER STATION FOR A SERIAL BUS SYSTEM, AND METHOD FOR COMMUNICATING IN A SERIAL BUS SYSTEM

(71) Applicant: Robert Bosch GmbH, Stuttgart (DE)

(72) Inventors: Arthur Mutter, Neuhausen (DE);
Florian Hartwich, Reutlingen (DE);
Franz Bailer, Moessingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/637,203

(22) PCT Filed: Aug. 6, 2020

(86) PCT No.: PCT/EP2020/072126
§ 371 (c)(1),
(2) Date: Feb. 22, 2022

(87) PCT Pub. No.: WO2021/047834
PCT Pub. Date: Mar. 18, 2021

(65) Prior Publication Data
US 2022/0286320 A1    Sep. 8, 2022

(30) Foreign Application Priority Data

Sep. 11, 2019   (DE) .................... 10 2019 213 783.0

(51) Int. Cl.
*H04L 12/40*        (2006.01)
(52) U.S. Cl.
CPC .. *H04L 12/40052* (2013.01); *H04L 12/40013* (2013.01); *H04L 12/40169* (2013.01)

(58) Field of Classification Search
CPC ......... H04L 12/40052; H04L 12/40013; H04L 12/40169
See application file for complete search history.

(56) References Cited

U.S. PATENT DOCUMENTS

2013/0343383 A1* 12/2013 Hartwich ................ H04L 12/40
                                                              370/389
2014/0337549 A1* 11/2014 Hartwich ............ G06F 13/4282
                                                              710/106

(Continued)

FOREIGN PATENT DOCUMENTS

DE    102012200997 A1    2/2013
DE    102015209196 A1    3/2016

(Continued)

OTHER PUBLICATIONS

ISO 11898-1:2015 Standard, 2015, pp. 1-74.
International Search Report for PCT/EP2020/072126, dated Nov. 13, 2020.

*Primary Examiner* — Rasheed Gidado
(74) *Attorney, Agent, or Firm* — Norton Rose Fulbright US LLP; Gerard Messina

(57) ABSTRACT

A user station for a serial bus system, including a communication control device for controlling a communication of the user station with at least one other user station of the bus system, and a transceiver device for transmitting a transmission signal, generated by the communication control device, onto a bus of the bus system. The communication control device is designed to generate the transmission signal according to a frame, and to insert into the frame at least one field that is designed for checking whether the bit stream of the frame in a user station of the bus system that receives the frame is shifted by at least one bit compared to the expected frame.

16 Claims, 5 Drawing Sheets

(56) References Cited

U.S. PATENT DOCUMENTS

2017/0070366 A1* 3/2017 Hehemann .......... H04L 25/0286
2022/0188260 A1* 6/2022 Heller .................... G06F 13/42

FOREIGN PATENT DOCUMENTS

EP 2728805 A2 5/2014
EP 3531629 A1 8/2019

* cited by examiner

USER STATION FOR A SERIAL BUS SYSTEM, AND METHOD FOR COMMUNICATING IN A SERIAL BUS SYSTEM

FIELD

The present invention relates to a user station for a serial bus system, and a method for communicating in a serial bus system that operates with a high data rate as well as great flexibility and with a high level of error robustness.

BACKGROUND INFORMATION

Bus systems for the communication between sensors and control units, for example in vehicles, are intended to allow the transfer of a large data volume, depending on the number of functions of a technical facility or a vehicle. Often there is a requirement for the data to be transferred from the sender to the receiver more quickly than previously, and also for large data packets to be transferable as needed.

At the present time, in vehicles, a bus system is used in the introduction phase, in which data are transferred as messages under the ISO 11898-1:2015 standard, as a CAN protocol specification with CAN FD. The messages are transferred between the bus users of the bus system, such as the sensor, control unit, transducer, etc. With most manufacturers, CAN FD is used in the vehicle at a 2 Mbit/s data bit rate and a 500 kbit/s arbitration bit rate in the first step.

To allow even higher data rates, at the present time a successor bus system for CAN FD (referred to below as CAN XL) is being developed. In addition to the strict data transport, CAN XL is intended to also support other functions via the CAN bus, such as functional safety, data security, and quality of service (QoS). These are basic properties that are required in an autonomously traveling vehicle.

Errors may always occur during the transfer of data in a frame via a channel (CAN bus), in particular due to external influences, in particular irradiation. The task of the communication protocol of CAN XL, among other things, is to detect and discard erroneously received frames. The quality of the error detection may be expressed by the residual error probability. The residual error probability indicates how likely it is that a frame is accepted as correct, despite errors in a receiving user station (reception node) of the bus system that is not a sender of the frame.

For the functional safety of a system, it is very advantageous and important for the residual error probability to be as small as possible. Class 1 errors, namely, bits (bit flips) sampled erroneously in an inverted manner, and/or class 2 errors, namely, locally accumulated bit errors (burst errors), that are transferred in the frame may be detected with the aid of a check sum (cyclic redundancy check (CRC)).

However, it is problematic when edges are generated or shifted due to external irradiation. As a result, the receiving user station (reception node) of the bus system, which is not a sender of the frame, may carry out shifted sampling of the bit stream in the received frame. The sampling of the bit stream may be shifted by one or multiple bits, which is also referred to as class 3 errors. For these types of errors, such a receiving user station is not able to reliably detect the error, using the check sum (CRC).

SUMMARY

An object of the present invention is to provide a user station for a serial bus system, and a method for communicating in a serial bus system, which solve the above-mentioned problems. In particular, on object of the present invention is to provide a user station for a serial bus system, and a method for communicating in a serial bus system, in which errors due to additional or shifted edges in a bit stream are detected with high reliability in order to achieve a high level of error robustness of the communication, even for a high data rate and an increase in the quantity of the useful data per frame.

The object may be achieved by a user station for a serial bus system in accordance with the present invention. In accordance with an example embodiment of the present invention, the user station includes a communication control device for controlling a communication of the user station with at least one other user station of the bus system, and a transceiver device for transmitting a transmission signal, generated by the communication control device, onto a bus of the bus system, so that for a message that is exchanged between user stations of the bus system, the bit time of a signal transmitted onto the bus in the first communication phase may be different from a bit time of a signal transmitted in the second communication phase, the communication control device being designed to generate the transmission signal according to a frame, and to insert into the frame at least one field that is designed to check whether the bit stream of the frame in a user station of the bus system that receives the frame is shifted by at least one bit compared to the expected frame.

Due to the embodiment of the user station, the residual error probability for a frame that is received from the bus may be reduced. As a result, a receiver of the frame may decode the correct frame length, and therefore also check the check sum (cyclic redundancy check (CRC)) at the end of the frame at the correct position. Errors in the communication in the bus system may thus be detected quickly and reliably.

By use of the user station, it is possible to guarantee the detection of a shifted data stream up to an N-bit shift. This allows a reliable transfer of frames via the bus, even in the event of irradiation.

It is also advantageous that the measures for reducing the residual error probability, with regard to class 3 errors, additionally require only a very small number of control bits. The new field FCP is thereby accommodated in the frame very innovatively. As a result, the data overhead in addition to the useful data actually to be transferred is very low.

When each fixed stuff bit is replaced by an FCP field, the data overhead may even be zero. In addition, the format check is very powerful, since multiple fixed stuff bits and therefore FCP fields are replaced. Due to the data overhead, which is low or is not increased, the transferable net data rate may be optimized, so that the communication in the bus system is slowed down no more than necessary.

As a result, by use of the user station, transmission and reception of the frames may be ensured with great functional safety and great flexibility with regard to instantaneous events during operation of the bus system and at a low error rate, even with an increased volume of useful data per frame.

By use of the user station in the bus system, it is thus possible in particular to maintain an arbitration from CAN in a first communication phase and still increase the transfer rate considerably compared to CAN or CAN FD.

A method carried out by the user station may also be used when at least one CAN user station and/or at least one CAN FD user station that transmit(s) messages according to the CAN protocol and/or CAN FD protocol are/is present in the bus system.

Advantageous further embodiments of the user station are disclosed herein.

According to one exemplary embodiment of the present invention, the communication control device is designed to insert the at least one field into the frame after a data field. The communication control device may be designed to insert the at least one field into the frame after a frame check sum that has been formed over all bits in the frame.

According to another exemplary embodiment of the present invention, the communication control device is designed to insert the at least one field prior to a data field in which useful data of the frame are inserted.

For a particularly high net data rate, the communication control device is designed to configure and/or arrange the at least one field in such a way that the contents of the at least one field in a receiving user station are to be used not only for the function of checking the shift of the bit stream, but also for a different function.

According to yet another exemplary embodiment of the present invention, the communication control device is designed to always insert one of the stated fields into the frame after a fixed number of bits.

It is possible for the communication control device to be designed to insert the at least one field into the frame as a fixed stuff bit, the communication control device being designed to insert all fixed stuff bits into the frame according to a fixed bit stuffing rule, according to which a fixed stuff bit is to be inserted after a fixed number of bits. The communication control device is possibly designed to select the value of the field as a function of which value would be selected for the stuff bit in order to insert an inverse stuff bit into the frame after five identical bits in succession.

The communication control device is optionally designed to use the same value for all the above-mentioned fields in the frame.

In one particular embodiment of the present invention, the communication control device is designed to use an even number of M bits for the at least one field, the first half of the M bits in each case having the same first value, and the second half of the M bits in each case having the same second value, which is inverse to the first value.

In another particular embodiment of the present invention, the communication control device is designed to insert into the at least one field at least the least significant bits of the number of fixed stuff bits that are inserted into the frame.

In yet another particular embodiment of the present invention, the communication control device is designed to insert into the at least one field at least the least significant bits of the number of frames that have already been transmitted onto the bus from the communication control device.

It is possible for the communication control device to be designed to provide a bit after a switchover of the second communication phase into the first communication phase, during which the transceiver device has time to switch over into the second communication phase, the communication control device being designed, in the case in which the user station of the bus system that receives the frame is, however, not the sender of the frame, to use the bit to check whether the bit stream of the received frame is shifted by at least one bit compared to the expected frame.

It is possible for the frame that is formed for the message to have a design that is compatible with CAN FD, in the first communication phase it being negotiated which of the user stations of the bus system in the subsequent second communication phase obtains, at least temporarily, exclusive, collision-free access to the bus.

The user station described above may be part of a bus system which also includes a bus and at least two user stations that are connected to one another via the bus in such a way that they may communicate serially with one another. At least one of the at least two user stations is a user station described above.

Moreover, the object stated above may be achieved by a method for communicating in a serial bus system according to an example embodiment of the present invention. The method may be carried out with a user station of the bus system that includes a communication control device and a transceiver device. In an example embodiment of the present invention, the method including the steps: controlling, via the communication control device, a communication of the user station with at least one other user station of the bus system, and transmitting, via the transceiver device, a transmission signal, generated by the communication control device, onto a bus of the bus system, so that for a message that is exchanged between user stations of the bus system, the bit time of a signal that is transmitted onto the bus in the first communication phase may be different from a bit time of a signal that is transmitted in the second communication phase, the communication control device generating the transmission signal according to a frame, and inserting into the frame at least one field that is designed to check whether the bit stream of the frame in a user station of the bus system that receives the frame is shifted by at least one bit compared to the expected frame.

The method yields the same advantages as stated above with regard to the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

Unless stated otherwise, identical or functionally equivalent elements are provided with the same reference numerals in the figures.

DETAILED DESCRIPTION OF EXAMPLE EMBODIMENTS

Figure 1:
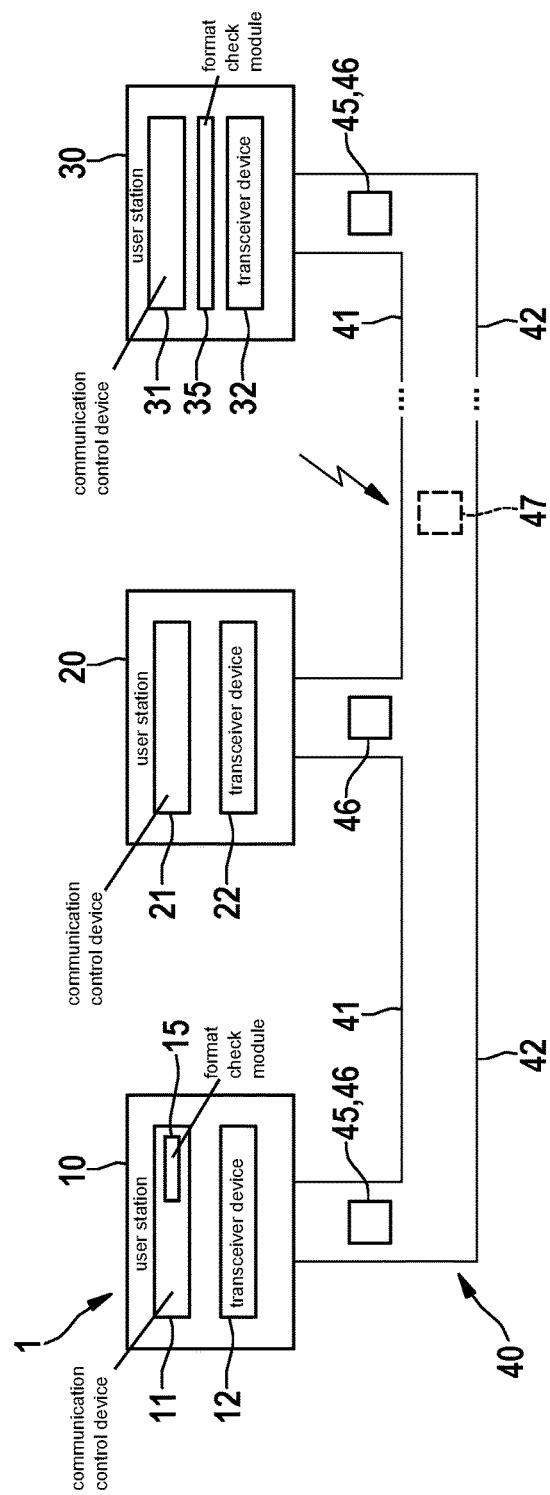
FIG. 1 shows a simplified block diagram of a bus system according to a first exemplary embodiment of the present invention.

FIG. 1 shows as an example a bus system 1 that is in particular the basis for the design of a CAN bus system, a CAN FD bus system, a CAN XL bus system, and/or modifications thereof, as described below. Bus system 1 may be used in a vehicle, in particular a motor vehicle, an aircraft, etc., or in a hospital, and so forth.

In FIG. 1, bus system 1 includes a plurality of user stations 10, 20, 30, each of which is connected to a first bus wire 41 and a second bus wire 42 at a bus 40. Bus wires 41, 42 may also be referred to as CAN_H and CAN_L or CAN XL_H and CAN XL_L, and are used for electrical signal transfer after coupling in the dominant levels or generating recessive levels or other levels for a signal in the transmission state. Messages 45, 46 in the form of signals are serially transferable between individual user stations 10, 20, 30 via bus 40. If an error occurs during the communication on bus 40, as illustrated by the serrated dark block arrow in FIG. 1, an error frame 47 (error flag) may optionally be transmitted. User stations 10, 20, 30 are, for example, control units, sensors, display devices, etc., of a motor vehicle.

As shown in FIG. 1, user station 10 includes a communication control device 11, a transceiver device 12, and a format check module 15. User station 20 includes a communication control device 21 and a transceiver device 22. User station 30 includes a communication control device 31, a transceiver device 32, and a format check module 35. Transceiver devices 12, 22, 32 of user stations 10, 20, 30 are each directly connected to bus 40, although this is not illustrated in FIG. 1.

Communication control devices 11, 21, 31 are each used for controlling a communication of particular user station 10, 20, 30 via bus 40 with at least one other user station of user stations 10, 20, 30 connected to bus 40.

Communication control devices 11, 31 create and read first messages 45, which are modified CAN messages 45, for example. Modified CAN messages 45 are built up based on a CAN XL format, described in greater detail with reference to FIG. 2, and in which particular format check module 15, 35 is used. Communication control devices 11, 31 may also be designed to provide a CAN XL message 45 or a CAN FD message 46 for transceiver device 32 or receive it from same, as needed. Particular format check modules 15, 35 are also used. Communication control devices 11, 31 thus create and read a first message 45 or second message 46, first and second messages 45, 46 differing by their data transmission standard, namely, CAN XL or CAN FD in this case.

Communication control device 21 may be designed as a conventional CAN controller according to ISO 11898-1: 2015, i.e., as a CAN FD-tolerant conventional CAN controller or a CAN FD controller. Communication control device 21 creates and reads second messages 46, for example CAN FD messages 46. CAN FD messages 46 may include 0 to 64 data bytes, which are also transferred at a much faster data rate than with a conventional CAN message. In particular, communication control device 21 is designed as a conventional CAN FD controller.

Transceiver device 22 may be designed as a conventional CAN transceiver according to ISO 11898-1:2015 or as a CAN FD transceiver. Transceiver devices 12, 32 may be designed to provide messages 45 according to the CAN XL format or messages 46 according to the present CAN FD format for associated communication control device 11, 31 or receive the messages from same, as needed.

A formation and then transfer of messages 45 having the CAN XL format, in addition to the reception of such messages 45, is achievable by use of the two user stations 10, 30.

Figure 2:
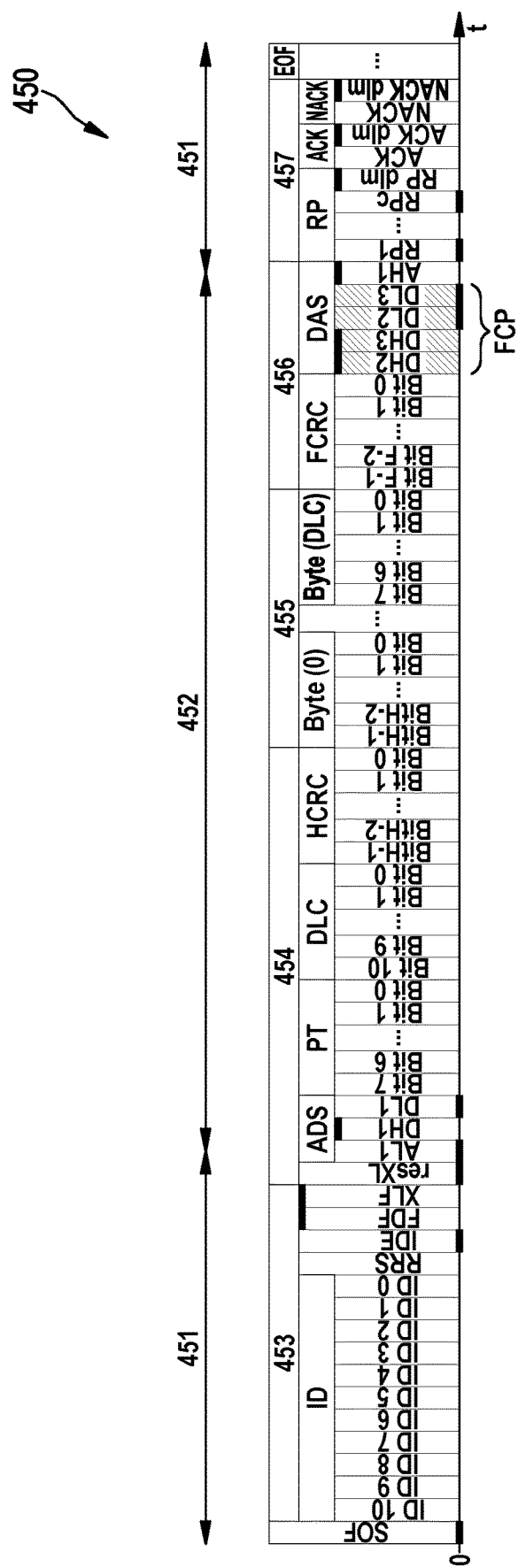
FIG. 2 shows a diagram for illustrating the design of a message that may be transmitted from a user station of the bus system according to the first exemplary embodiment of the present invention.

FIG. 2 shows for message 45 a CAN XL frame 450, which is provided by communication control device 11 for transceiver device 12 for transmitting onto bus 40. In the present exemplary embodiment, communication control device 11 creates frame 450 so as to be compatible with CAN FD, as also illustrated in FIG. 2. The same analogously applies for communication control device 31 and transceiver device 32 of user station 30.

According to FIG. 2, for the CAN communication on bus 40, CAN XL frame 450 is divided into different communication phases 451, 452, namely, an arbitration phase 451 and a data phase 452. Frame 450 includes an arbitration field 453, a control field 454, a data field 455, a check sum field 456 for a check sum FCRC, a switchover sequence ADS, and an acknowledgment field 457.

In arbitration phase 451, with the aid of an identifier ID in arbitration field 453, bit-by-bit negotiation is carried out between user stations 10, 20, 30 concerning which user station 10, 20, 30 would like to transmit message 45, 46 having the highest priority, and therefore for the next time period for transmitting in subsequent data phase 452 obtains exclusive access to bus 40 of bus system 1. A physical layer, similarly as with CAN and CAN FD, is used in arbitration phase 451. The physical layer corresponds to the bit transfer layer or layer one of the conventional Open Systems Interconnection (OSI) model.

An important point during phase 451 is that the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, which is very advantageous.

Consequently, the CSMA/CR method must provide so-called recessive states on bus 40, which may be overwritten by other user stations 10, 20, 30 with dominant states on bus 40. In the recessive state, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

In data phase 452, in addition to a portion of control field 454, the useful data of the CAN XL frame or of message 45 from data field 455 and check sum field 456 for check sum FCRC, and also a field DAS, which is used to switch over from data phase 452 back to data phase 451, are transmitted.

A sender of message 45 starts a transmission of bits of data phase 452 onto bus 40 only after user station 10, as the sender, has won the arbitration, and user station 10, as the sender, thus has exclusive access to bus 40 of bus system 1 for the transmission.

In general, in the bus system with CAN XL, in comparison to CAN or CAN FD the following differing properties may be achieved:
a) acquiring and optionally adapting proven properties that are responsible for the robustness and user-friendliness of CAN and CAN FD, in particular a frame structure including identifiers and arbitration according to the CSMA/CR method,
b) increasing the net data transfer rate, in particular to approximately 10 megabits per second,
c) increasing the quantity of the useful data per frame, in particular to approximately 4 kbytes or some other arbitrary value.

As illustrated in FIG. 2, in arbitration phase 451 user station 10 partially uses as the first communication phase, in particular up to and including the FDF bit, a format from CAN/CAN FD according to ISO 11898-1:2015. In contrast, beginning with the FDF bit in the first communication phase and in the second communication phase (data phase 452), user station 10 uses a CAN XL format, as described below.

In the present exemplary embodiment, CAN XL and CAN FD are compatible. The res bit from CAN FD, referred to below as the XLF bit, is utilized for switching from the CAN FD format over to the CAN XL format. Therefore, the frame formats of CAN FD and CAN XL are identical up to the res bit. Not until the res bit does a receiver detect in which format the frame is transmitted. A CAN XL user station, i.e., user stations 10, 30 here, also support(s) CAN FD.

As an alternative to frame 450 shown in FIG. 2, in which an identifier including 11 bits is used, a CAN XL expanded frame format is optionally possible in which an identifier including 29 bits is used. Up until the FDF bit, this is identical to the CAN FD expanded frame format from ISO 11898-1:2015.

According to FIG. 2, frame 450 from the SOF bit up to and including the FDF bit is identical to the CAN FD base frame format according to ISO 11898-1:2015. Therefore, the conventional structure is not further explained here. Bits illustrated with a thick bar at their lower line in FIG. 2 are transmitted in frame 450 as dominant or "0." Bits illustrated with a thick bar at their upper line in FIG. 2 are transmitted in frame 450 as recessive or "1." In CAN XL data phase 452, symmetrical "1" and "0" levels are used instead of recessive and dominant levels.

In general, two different stuffing rules are applied in the generation of frame 450. Up until the XLF bit in control field 454, the dynamic bit stuffing rule from CAN FD applies, so that an inverse stuff bit is to be inserted after 5 identical bits in succession. A fixed stuffing rule applies after a resXL bit in control field 454, so that a fixed stuff bit is to be inserted after a fixed number of bits. Alternatively, instead of only one stuff bit, 2 or more bits may be inserted as fixed stuff bits, as also described in greater detail below.

In frame 450, the FDF bit is directly followed by the XLF bit, which from the position corresponds to the "res bit" in the CAN FD base frame format, as mentioned above. If the XLF bit is transmitted as 1, i.e., recessive, it thus identifies frame 450 as a CAN XL frame. For a CAN FD frame, communication control device 11 sets the XLF bit as 0, i.e., dominant.

In frame 450, the XLF bit is followed by a resXL bit, which is a dominant bit for future use. For frame 450, the resXL [bit] must be transmitted as 0, i.e., dominant. However, if user station 10 receives a resXL bit as 1, i.e., recessive, receiving user station 10 goes into a protocol exception state, for example, as carried out with a CAN FD message 46 for res=1. Alternatively, the resXL bit could be defined the opposite way, i.e., that it must be transmitted as 1, i.e., recessive. In this case, for a dominant resXL bit the receiving user station goes into the protocol exception state.

In frame 450, the resXL bit is followed by a sequence ADS (arbitration data switch), in which a predetermined bit sequence is encoded. This bit sequence allows a simple and reliable switch from the bit rate of arbitration phase 451 (arbitration bit rate) over to the bit rate of data phase 452 (data bit rate). For example, the bit sequence of the ADS sequence is made up of an AL1 bit that is transmitted as dominant, i.e., 0. The AL1 bit is the last bit of arbitration phase 451. The physical layer in transceiver device 12, 22, 32 is switched over within the AL1 bit. The two subsequent bits DH1 and DL1 are already transmitted at the data bit rate. For CAN XL, bits DH1 and DL1 are thus temporally short bits of data phase 452.

In frame 450, sequence ADS is followed by a PT field that denotes the contents of data field 455. The contents indicate what type of information is contained in data field 455. For example, the PT field indicates whether an Internet Protocol (IP) frame, a tunneled Ethernet frame, or some other frame is present in data field 455.

The PT field is followed by a DLC field into which data length code DLC, which indicates the number of bytes in data field 455 of frame 450, is inserted. Data length code DLC may assume any value from 0 up to the maximum length of data field 455 or the data field length. If the maximum data field length is in particular 2048 bits, data length code DLC requires 11 bits, under the assumptions that DLC=0 means a data field length that includes 1 byte, and DLC=2047 means a data field length that includes 2048 bytes. Alternatively, data field 455 having the length 0 could be allowed, as with CAN, for example. DLC=0 would encode, for example, the data field length with 0 byte. With 11 bits, for example, the maximum encodable data field length is then $(2^{11})-1=2047$.

In frame 450, the DLC field is followed by a header check sum HCRC. Header check sum HCRC is a check sum for safeguarding the header of frame 450, i.e., all bits from the start of frame 450 including the SOF bit to the start of header check sum HCRC, including all dynamic, and optionally, fixed, stuff bits up to the start of header check sum HCRC. The length of header check sum HCRC, and thus of the check sum polynomial according to cyclic redundancy check CRC, is to be selected corresponding to the desired Hamming distance. For a data length code DLC of 11 bits, the data word to be safeguarded by header check sum HCRC is longer than 27 bits. Therefore, in order to achieve a Hamming distance of 6, the polynomial of header check sum HCRC must be at least 13 bits long.

In frame 450, header check sum HCRC is followed by data field 455. Data field 455 is made up of 1 to n data bytes, where n is, for example, 2048 bytes or 4096 bytes or some other arbitrary value. Alternatively, a data field length of 0 is possible. The length of data field 455 is encoded in the DLC field, as described above.

In frame 450, data field 455 is followed by a frame check sum FCRC. Frame check sum FCRC is made up of the bits of frame check sum FCRC. The length of frame check sum FCRC, and thus of the CRC polynomial, is to be selected corresponding to the desired Hamming distance. Frame check sum FCRC safeguards entire frame 450. Alternatively, only data field 455 is optionally safeguarded with frame check sum FCRC.

In frame 450, frame check sum FCRC is followed by sequence DAS (data arbitration switch) in which a predetermined bit sequence is encoded. This bit sequence allows a simple and reliable switch from the data bit rate of data phase 452 over to the arbitration bit rate of arbitration phase 451. For example, the bit sequence of sequence DAS is made up of a recessive arbitration bit DH2 followed by a dominant arbitration bit DL2. In this example, the bit rate may be switched over at the edge between the two stated bits. The DAS field generally includes three bits, i.e., the DH2 bit, the DL2 bit, and an AH1 bit. Of the bits, the first bit and last bit are transmitted as recessive, i.e., 1, and the middle bit is transmitted as dominant, i.e., 0.

In a departure from the preceding example, in the present exemplary embodiment, sequence DAS contains a field FCP via which user stations 10, 30, in particular their format check modules 15, 35, are able to detect in a received frame 450 a shift of the bit stream. The longer the bit pattern of the FCP field, the greater or stronger is the shift that may be detected in receiving user station 10, 30. The most advantageous bit pattern for the shift detection contains an even number of M bits, the first M/2 bits containing a 1 and the subsequent M/2 bits containing a 0. In the example from FIG. 2, with an FCP field including 4 bits, the first two bits are transmitted as recessive, i.e., 1. The last two bits of the FCP field are transmitted as dominant, i.e., 0. Thus, the FCP field including four bits according to FIG. 2, due to additional bits DH3, DL3, differs from the customary two bits at the start of the DAS field. However, the edge from recessive to dominant in the FCP field from FIG. 2 may fulfill the same function as in a customary DAS field, which does not include bits DH3, DL3.

In general, it is possible that in the FCP field, the first M/2 bits contain a 0 and the subsequent M/2 bits contain a 1. A shift by M−1 may be detected using field FCP. This is described in greater detail below with reference to FIG. 3.

In frame 450, sequence DAS is followed by an acknowledgment field 457, which starts with an RP field. A synchronization pattern (sync pattern) is kept in the RP field, and allows a receiving user station 10, 30 to detect the start of arbitration phase 451 after data phase 452. The synchronization pattern allows receiving user station 10, 30, which cannot detect the correct length of data field 455, for example due to an erroneous header check sum HCRC, to synchronize. These user stations may subsequently transmit a "negative acknowledge" in order to communicate the incorrect reception. This is very important in particular when CAN XL no longer allows error frames 47 (error flags) in data field 455.

The RP field is followed by an acknowledgment (ACK) field 457 made up of multiple bits for acknowledgment or non-acknowledgment of a correct receipt of frame 450. In the example of FIG. 2, an ACK bit, an ACK dlm bit, a NACK bit, and a NACK dlm bit are provided. The NACK bit and the NACK dlm bit are optional bits. Receiving user stations 10, 30 transmit the ACK bit as dominant when they have correctly received frame 450. The transmitting user station transmits the ACK bit as recessive. Therefore, the bit in frame 450 originally transmitted onto bus 40 may be overwritten by receiving user stations 10, 30. The ACK dlm bit is transmitted as a recessive bit, which is used for separation from other fields. The NACK bit and the NACK dlm bit are used so that a receiving user station may signal an incorrect reception of frame 450 on bus 40. The function of the bits is the same as that of the ACK bit and the ACK dlm bit.

In frame 450, acknowledgment (ACK) field 457 is followed by an end field (end of frame (EOF)). The bit sequence of end field EOF is used to denote the end of frame 450. End field EOF ensures that 8 recessive bits are transmitted at the end of frame 450. This is a bit sequence that cannot occur within frame 450. As a result, the end of frame 450 may be reliably detected by user stations 10, 20, 30.

End field EOF has a length that is different, depending on whether a dominant bit or a recessive bit has been observed in the NACK bit. If the transmitting user station has received the NACK bit as dominant, end field EOF includes 7 recessive bits. Otherwise, end field EOF is only 5 recessive bits long.

In frame 450, end field EOF is followed by an interframe space IFS, not illustrated in FIG. 2. This interframe space IFS is designed according to ISO 11898-1:2015, as with CAN FD.

Figure 3:
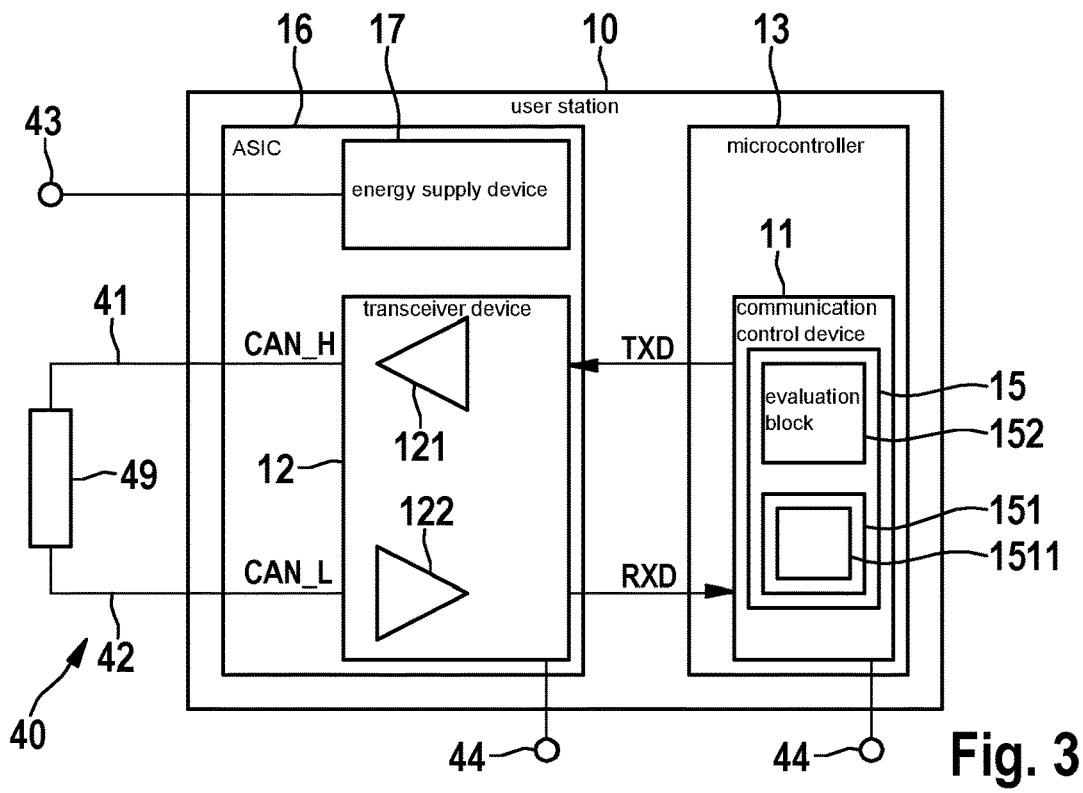
FIG. 3 shows a simplified schematic block diagram of a user station of the bus system according to the first exemplary embodiment of the present invention.

FIG. 3 shows the basic design of user station 10 together with communication control device 11, transceiver device 12, and format check module 15, which is part of communication control device 11. User station 30 has a design similar to that shown in FIG. 3, except that format check module 35 according to FIG. 1 is situated separately from communication control device 31 and transceiver device 32. Therefore, user station 30 is not separately described.

According to FIG. 3, in addition to communication control device 11 and transceiver device 12, user station 10 includes a microcontroller 13 with which control device 11 is associated, and a system application-specific integrated circuit (ASIC) 16, which alternatively may be a system base chip (SBC) on which multiple functions necessary for an electronics assembly of user station 10 are combined. In addition to transceiver device 12, an energy supply device 17 that supplies transceiver device 12 with electrical energy is installed in system ASIC 16. Energy supply device 17 generally supplies a voltage CAN Supply of 5 V. However, depending on the requirements, energy supply device 17 may supply some other voltage having a different value. Additionally or alternatively, energy supply device 17 may be designed as a power source.

Format check module 15 includes an insertion block 151 and an evaluation block 152, which are described in greater detail below.

Transceiver device 12 also includes a transmission module 121 and a reception module 122. Even though transceiver device 12 is consistently referred to below, it is alternatively possible to provide reception module 122 in a separate device externally from transmission module 121. Transmission module 121 and reception module 122 may be designed as a conventional transceiver device 22. Transmission module 121 may in particular include at least one operational amplifier and/or one transistor. Reception module 122 may in particular include at least one operational amplifier and/or one transistor.

Transceiver device 12 is connected to bus 40, or more precisely, to its first bus wire 41 for CAN_H or CAN XL_H and its second bus wire 42 for CAN_L or CAN XL_L. The supplying of voltage for energy supply device 17 for supplying first and second bus wires 41, 42 with electrical energy, in particular with voltage CAN Supply, takes place via at least one terminal 43. The connection to ground or CAN_GND is achieved via a terminal 44. First and second bus wires 41, 42 are terminated via a terminating resistor 49.

In transceiver device 12, first and second bus wires 41, 42 are not just connected to transmission module 121, also referred to as a transmitter, and to reception module 122, also referred to as a receiver, even though the connection in FIG. 3 is not shown for simplification.

During operation of bus system 1, transmission module 121 converts a transmission signal TXD or TxD of communication control device 11 into corresponding signals CAN XL_H and CAN XL_L for bus wires 41, 42, and transmits these signals CAN XL_H and CAN XL_L onto bus 40 at the terminals for CAN_H and CAN_L.

Figure 4:
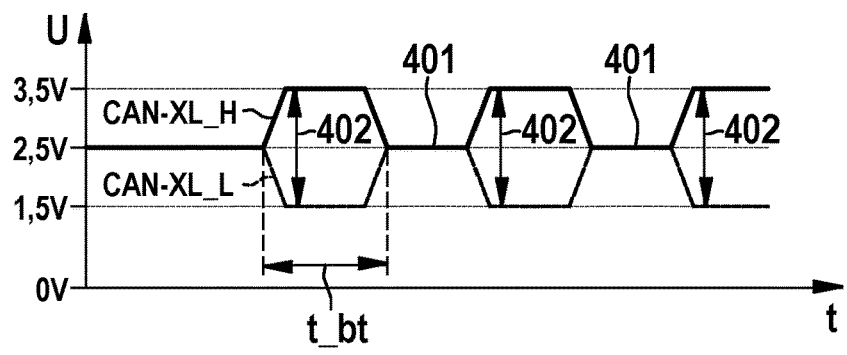
FIG. 4 shows a temporal profile of bus signals CAN XL_H and CAN XL_L for the user station according to the first exemplary embodiment of the present invention.

According to FIG. 4, reception module 122 forms a reception signal RXD or RxD from signals CAN XL_H and CAN XL_L that are received from bus 40, and passes it on to communication control device 11, as shown in FIG. 3. With the exception of an idle or standby state, transceiver device 12 with reception module 122 during normal operation always listens to a transfer of data or messages 45, 46 on bus 40, in particular regardless of whether or not transceiver device 12 is the sender of message 45.

Figure 5:
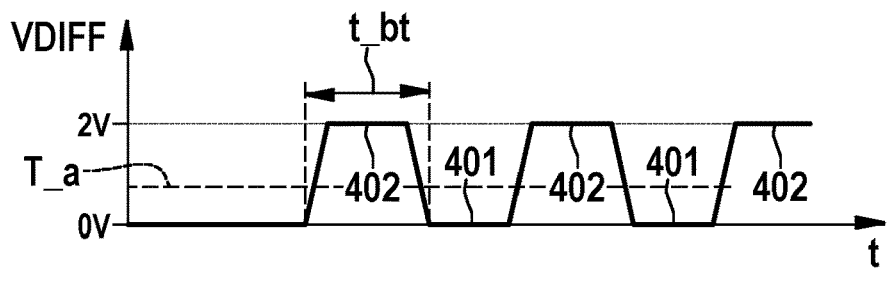
FIG. 5 shows a temporal profile of a differential voltage VDIFF of bus signals CAN XL_H and CAN XL_L for the user station according to the first exemplary embodiment of the present invention.

According to the example from FIG. 4, signals CAN XL_H and CAN XL_L, at least in arbitration phase 451, include dominant and recessive bus levels 401, 402, as from CAN. A difference signal VDIFF=CAN XL_H−CAN XL_L, shown in FIG. 5, is formed on bus 40. The individual bits of signal VDIFF with bit time t_bt may be detected using a reception threshold of 0.7 V. In data phase 452 the bits of signals CAN XL_H and CAN XL_L are transmitted more quickly, i.e., with a shorter bit time t_bt, than in arbitration phase 451. Thus, signals CAN XL_H and CAN XL_L in data phase 452 differ from conventional signals CAN_H and CAN_L, at least in their faster bit rate.

The sequence of states 401, 402 for signals CAN XL_H, CAN XL_L in FIG. 4 and the resulting pattern of voltage VDIFF from FIG. 5 are used only for illustrating the function of user station 10. The sequence of data states for bus states 401, 402 is selectable as needed.

In other words, transmitter 121 in a first operating mode according to FIG. 4 generates a first data state as bus state 402 with different bus levels for two bus wires 41, 42 of the bus line, and a second data state as bus state 401 with the same bus level for the two bus wires 41, 42 of the bus line of bus 40.

In addition, transmitter 121 transmits the bits onto bus 40 at a higher bit rate for the temporal profiles of signals CAN XL_H, CAN XL_L in a second operating mode, which includes data phase 452. CAN XL_H and CAN XL_L signals may also be generated in data phase 452 with a different physical layer than with CAN FD. The bit rate in data phase 452 may thus be increased even further than with CAN FD.

Format check module 15 from FIG. 3, in particular its insertion block 151, is used to insert the FCP field into frame 450 when user station 10 acts as the sender of frame 450. In the example from FIG. 2, insertion block 151 has inserted only a single FCP field into frame 450. The FCP field is placed in frame 450 as late as possible so that shifts at the end of frame 450 are also detectable. A placement after frame check sum FCRC, as shown in FIG. 2 as an example, is very advantageous since this is the last possible position.

In the present exemplary embodiment, format check module 15 from FIG. 3 is designed in such a way that the FCP field replaces the DH2 bits and the DL2 bits of the DAS field. For this purpose, the FCP field must be selected as 1100 or 111000, etc., so that the function of DH2/DL2 is retained. Thus, the FCP field is used not only to enable a reliable format check, but also as a synchronization edge prior to the switchover from data phase 452 into arbitration phase 451. The FCP field thus has two different functions. As a result, the FCP field generates as little data overhead as possible.

Format check module 15 from FIG. 3 is optionally designed to alternatively or additionally integrate the FCP field into the ADS field. Insertion block 151 may thus insert at least one FCP field into frame 450.

Evaluation block 152 of format check module 15 from FIG. 3 is used to check the format of the bit stream received from bus 40, using the FCP field.

If the FCP field includes M=4 bits, for example, insertion block 151 may insert the FCP field as "1100" or "0011." Consequently, the FCP field is transmitted as "1100" or "0011." If receiving user station 10 samples some other value for the FCP field, using evaluation block 152, evaluation block 152 evaluates this to mean that a shift of the bit stream of frame 450 is present. With such a bit sequence in the FCP field, receiving user station 10 may reliably detect, using evaluation block 152, a shift of the bit stream received from bus 40 by M−1=3 bits to the left or by M−1=3 bits to the right. This is illustrated in the following table.

| Case | Sampling result for receiving user station |
|---|---|
| Shift to the right by 3 bits | 0xxx |
| Shift to the right by 2 bits | 00xx |
| Shift to the right by 1 bit | 100x |
| No shift | 1100 |
| Shift to the left by 1 bit | x110 |
| Shift to the left by 2 bits | xx11 |
| Shift to the left by 3 bits | xxx1 |

In the table, x stands for an arbitrary bit value, i.e., 0 or 1. The FCP field is transmitted as "1100," as indicated in the middle of the table. If no edge shift, and thus no shift of the bit stream, takes place, the receiving user station also samples the FCP field as "1100."

Above and below the transmitted field "1100," the table illustrates the cases in which receiving user station 10 (reception node), which in this example is not a sender of frame 450, samples the bit stream in a shifted manner due to an error. "Shift to the right by 3 bits" means that the view of the receiving user station (reception node) is shifted by 3 bits, and in particular in this case is late by 3 bits. Accordingly, receiving user station 10 (reception node) samples the last bit of the transmitted FCP field as the first bit of the received FCP field. The other three bits of the received FCP field then have different values, denoted here by "x."

"Shift to the left by 1 bit" means that the view of receiving user station 10 (reception node) is shifted by 1 bit, and in particular in this case is early by 1 bit. Accordingly, receiving user station 10 (reception node) samples the first 3 bits of the transmitted FCP field as the last bit of the received FCP field.

It is apparent from the table that the value of the FCP field sampled by receiving user station 10 (reception node), independently of the value that the bits denoted by "x" have, for a shift is always different, in at least one bit, from the expected value of the FCP field. Receiving user station 10 (reception node), in particular its format check module 15 and more precisely its evaluation block 152, may thus detect the shift, i.e., the error, in the received bit stream. Evaluation block 152 outputs a corresponding communication to communication control device 11. Received frame 450 may thus be discarded in the event of an error. As a result, communication control device 11 may transmit an error frame 47 to bus 40.

According to another example of a fixed value of the FCP field in the present exemplary embodiment, the FCP field includes 6 bits, so that M=6 bits. Insertion block 151 thus inserts the FCP field as "111000" or "000111." Consequently, the FCP field is transmitted as "111000" or "000111." If receiving user station 10, which is not a sender of the frame, samples some other value for the FCP field, using evaluation block 152, evaluation block 152 evaluates this to mean that a shift of the bit stream is present. With such a bit sequence in the FCP field, receiving user station 10 may reliably detect, using evaluation block 152, a shift of the bit stream received from bus 40 by M−1=5 bits to the left or to the right.

Of course, other fixed lengths of the FCP field, and thus other fixed values of the FCP field, are possible.

According to one modification of the present exemplary embodiment, the FCP field has variable contents.

As an example of such variable contents of the FCP field, the number of fixed stuff bits in the FCP field may be transferred. The number of fixed stuff bits is a function of the length of frame 450. If the width of the FCP field, i.e., the number of bits that are provided in frame 450 for the FCP field, is not adequate to transfer the entire number of fixed stuff bits, only the less significant bits of a fixed stuff bit counter may be transmitted.

As another example of such variable contents of the FCP field, the number of frames 450 in the FCP field transmitted by a transmitting user station (transmission node) may be transferred. The number of frames 450 transmitted by a transmission node may also be referred to as a frame counter.

Figure 6:
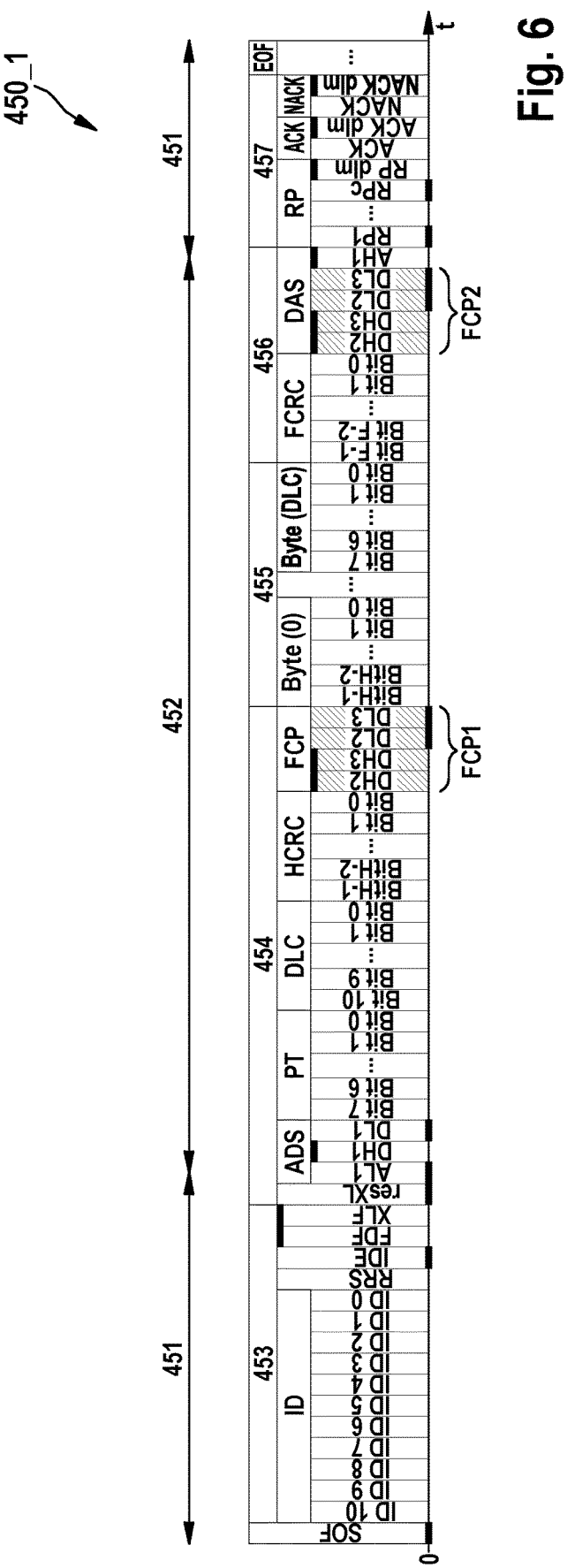
FIG. 6 shows a diagram for illustrating the design of a message that may be transmitted from a user station of the bus system according to a second exemplary embodiment of the present invention.

FIG. 6 shows a frame 450_1 according to a second exemplary embodiment in which CAN XL and CAN FD are compatible. In this exemplary embodiment, frame 450_1 and thus the CAN XL frame format are different from frame 450 from FIG. 2, as described below. Only the differences from frame 450 from FIG. 2 are described below. In other respects, frames 450, 450_1 of the two exemplary embodiments are the same.

At least two FCP fields are present in frame 450_1. In the example from FIG. 6, in frame 450_1, an FCP field FCP1 is inserted after header check sum HCRC, and an FCP field FCP2 is inserted after frame check sum FCRC. Also for frame 450_1, FCP fields FCP1, FCP2 have a length M=4 bits as an example. Of course, some other length for the FCP field may be selected. In particular, it is possible for the lengths, i.e., the number of bits of FCP fields FCP1, FCP2, to be different.

In general, insertion block 151 may be designed to insert an FCP field at an arbitrary position in frame 450_1. Evaluation block 152 is designed to search the FCP field at the insertion points in question and thus evaluate received frame 450_1.

In particular, insertion block 151 is designed to insert an FCP field multiple times into frame 450_1 to be transmitted. For example, an FCP field may always be inserted with the same contents, always after a predetermined number of pieces of data, in particular always after 128 bytes of data or some other arbitrary value. Of course, other examples are possible.

Figure 7:
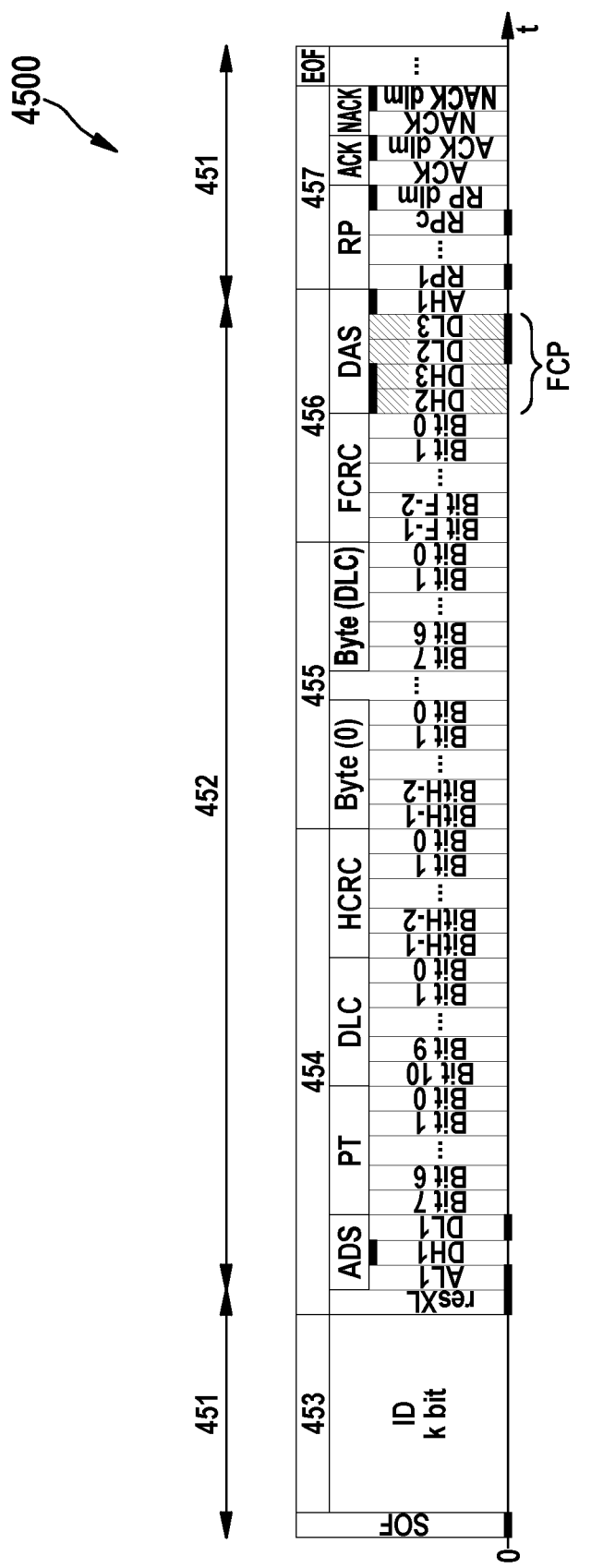
FIG. 7 shows a diagram for illustrating the design of a message that may be transmitted from a user station of the bus system according to a third exemplary embodiment of the present invention.

FIG. 7 shows a frame 4500 according to a third exemplary embodiment in which the frame formats of CAN XL and CAN FD are not compatible. In this exemplary embodiment, frame 4500 and thus the CAN XL frame format are different from frame 450 from FIG. 2, as described below. Only the differences from frame 450 from FIG. 2 are described. In other respects, frames 450, 4500 of the two exemplary embodiments are the same.

In general, when creating frame 4500 according to the present exemplary embodiment only the fixed stuffing rule is used, so that a fixed stuff bit is to be inserted after a fixed number of bits. Alternatively, instead of only one stuff bit, two or more bits may also be inserted as fixed stuff bits. For a known value of data length code DLC, this results in a constant frame length or a constant length of frame 4500. This prevents various problems that are caused by dynamic stuff bits.

In frame 4500 according to the present exemplary embodiment, identifier ID is no longer limited to 11 bits or 29 bits as with CAN FD. Number k of the bits of identifier ID may be freely selected. However, number k is alternatively settable to a fixed value. For a high net data rate, an ID including k=8 bits is reasonable. This is sufficient to give each user station 10, 20, 30 of bus system 1 an adequate number of bus access priorities. Of course, some other value of k is selectable, depending on the need and the number of various priorities in bus system 1.

Bits RRS, IDE, FDF, XLF of frame 450 from FIG. 2 are no longer necessary in frame 4500 and are omitted. This saves 4 bits, so that the frame overhead is reduced. The net data rate in bus system 1 is thus increased.

End field EOF includes only 5 bits in frame 4500 when the NACK bit is dominant. In contrast, if the NACK bit is recessive, end field EOF includes 3 bits. This ensures that 6 recessive bits are transmitted at the end of frame 4500. This number of recessive bits cannot occur at any other location in a valid frame 4500 when a fixed stuff bit is inserted after 5 identical bits in arbitration phase 451. Alternatively, there could be more than 6 bits. In particular, the number of EOF bits must be adapted to the number of bits after which a fixed stuff bit is inserted.

Interframe space IFS does not require a minimum length in frame 4500. In particular, interframe space IFS may have the length 0. In such a case, two frames 4500 are seamlessly transmitted in succession. However, an interframe space IFS that includes 1 bit, for example, is also reasonable in order to increase the robustness of bus system 1 in comparison to the previously stated case. Due to the now 7 recessive bits between two frames 4500, a new user station at bus 40 may synchronize more reliably.

According to a fourth exemplary embodiment, the FCP field is used as a fixed stuff bit. In other words, insertion block 151 is designed to insert an FCP field instead of a fixed stuff bit into frame 450. In such a case, a short FCP field, for example having the length M=2 bits, is sufficient, since only a small shift may result between two stuff bits.

Thus, also in the present exemplary embodiment, the FCP field has two different functions, namely, stuff bit and format check.

An FCP field having a length M=2 bits results in a very low data overhead, or even no data overhead at all. This is explained in greater detail below.

In the present exemplary embodiment, an FCP field with constant contents is always used instead of a fixed stuff bit. The bit pattern in the FCP field is selected by insertion block 151 in such a way that the FCP field contains a synchronization edge. If CAN XL synchronizes to falling edges, the value "10" would be advantageous for the FCP field. If CAN XL were synchronized to the rising edge, the value "01" would be advantageous for the FCP field.

For fixed stuff bits, in the worst case for the synchronization a falling edge is present only after every other stuff bit.

Since synchronization may always be carried out for an FCP field, the distance between two FCP fields may thus be twice as great as the distance between two fixed stuff bits without adversely affecting the synchronization of a receiving user station 10, 30 (reception node).

Since the FCP field includes 2 bits, but occurs only half as often as a fixed stuff bit, the data overhead due to the FCP field is identical to the data overhead that is generated by fixed stuff bits.

The great advantage of the FCP field is that its contents are constant. It is thus possible to reliably determine shifts in the data stream. In the described example with M=2 bits, shifts in receiving user station 10, 30 (reception node) by 1 bit may be reliably detected. As a result of the FPC [sic; FCP] field occurring so often in the frame, shifts may be detected immediately and effectively. An error in received frame 450 may thus be detected very quickly, and the transmission of frame 450 may be quickly aborted. This contributes to a faster transfer of useful data in bus system 1.

According to one modification of the present exemplary embodiment, receiving user station 10, 30 (CAN XL reception node) may carry out a resynchronization only at the edges in the FCP field instead of resynchronizing at each falling edge. Due to the resynchronization thus being limited to the necessary edges, the risk of receiving user station 10, 30 (CAN XL reception node) synchronizing to a faulty edge, and thus inserting an error, is reduced.

The great advantage of this modification of the present exemplary embodiment is that the number of resynchronization errors decreases, since the edges in the FCP field must now be explicitly faulty in order for a mis-synchronization to take place.

According to a fifth exemplary embodiment, the FCP field is once again used as a fixed stuff bit, as in the preceding exemplary embodiment. However, in the present exemplary embodiment an FCP field with variable contents is always used instead of a fixed stuff bit. Thus, also in the present exemplary embodiment, the FCP field has two different functions, namely, stuff bit and format check.

Insertion block 151 always selects an FCP field that is appropriate for the value of the stuff bit. Since a stuff bit may have two values, namely, 0 or 1, two different FCP fields are used. Thus, insertion block 151 may either insert an FCP field FCP_A having the value "01," or an FCP field FCP B having the value "10."

Therefore, insertion block 151 inserts an FCP field depending on the value of the potential stuff bit. For example, FCP field FCP_A would be inserted and transmitted when the stuff bit is 0. If the stuff bit is 1, FCP field FCP B would be inserted and transmitted.

Of course, for insertion block 151 the principle of the variable contents of the FCP field is applicable to the generation of other FCP fields.

According to a sixth exemplary embodiment, the AH1 bit is used as an additional or single FCP field. This is possible when the AH1 bit is not evaluated in some other way according to the present standardized version of CAN XL. At the present time, the AH1 bit is used solely to have time in transceiver device 12, 32 for a switchover of the physical layer from data phase 452 into arbitration phase 451.

In such a case, the reception node may signal to transceiver device 12, 32 the switchover of the physical layer, for example via a TXD line. This is possible due to the fact that the reception node does not use its TXD line for transmission. This does not occur in the transmission node, since the transmission node uses its TXD line for transmission.

As a result, the reception node or user station 10 as a receiving user station may evaluate, i.e., sample, the AH1 bit, using its evaluation block 152. Since the AH1 bit has a constant value, it is also used to check the format of the received frame (format check). The AH1 bit assists in detecting whether the reception node samples the bit stream in a shifted manner. The check of the format of the received frame (format check) may thus be reliably carried out, or further reinforced for additional FCP fields.

The evaluation of the AH1 bit has the advantage that the check of the format (format check) of received frame 450 does not result in data overhead. Thus, also in the present exemplary embodiment, the FCP field has two different functions, namely, the function of the previous AH1 bit and format check.

All of the above-described embodiments of user stations 10, 20, 30, of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Although the present invention is described above with the example of the CAN bus system, the present invention may be employed for any communications network and/or communication method in which two different communication phases are used in which the bus states, which are generated for the different communication phases, differ. In particular, the present invention is usable for developments of other serial communications networks, such as Ethernet and/or 100Base-T1 Ethernet, field bus systems, etc.

In particular, bus system 1 according to the exemplary embodiments may also be a communications network in which data are serially transferable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30 in bus system 1 of the exemplary embodiments is arbitrary. In particular, user station 20 in bus system 1 may be dispensed with. It is possible for one or multiple of user stations 10 or 30 to be present in bus system 1. It is possible for all user stations in bus system 1 to have the same design, i.e., for only user station 10 or only user station 30 to be present.

What is claimed is:

1. A user station for a serial bus system of a vehicle, comprising:
  a communication control device to control a communication of the user station with at least one other user station of the bus system; and
  a transceiver device to transmit a transmission signal, generated by the communication control device, onto a bus of the bus system, so that for a message that is exchanged between the user stations of the bus system, a bit time of a signal transmitted onto the bus in a first communication phase can differ from a bit time of a signal transmitted in a second communication phase;
  wherein the communication control device is configured to generate the transmission signal according to a frame, and to insert into the frame at least one field that is used for checking whether a bit stream of the frame in a user station of the bus system that receives the frame is shifted by at least one bit compared to an expected frame,
  wherein the serial bus system uses CAN XL, and
  wherein a residual error probability is reduced for a frame that is received from the bus, so that a receiver of the frame can check a check sum, which is a cyclic redundancy check (CRC), at an end of the frame at a correct position, for guaranteeing a detection of a shifted data stream up to an N-bit shift, so as to allow a more reliable transfer of frames via the bus, even in the event of irradiation.

2. The user station as recited in claim 1, wherein the communication control device is configured to insert the at least one field into the frame after a data field.

3. The user station as recited in claim 1, wherein the communication control device is configured to insert the at least one field into the frame after a frame check sum that has been formed over all bits in the frame.

4. The user station as recited in claim 1, wherein the communication control device configured to insert the at least one field prior to a data field in which useful data of the frame are inserted.

5. The user station as recited in claim 1, wherein the communication control device is configured to configure and/or arrange the at least one field so that contents of the at least one field in a receiving user station are to be used not only for a function of checking the shift of the bit stream, but also for a different function.

6. The user station as recited in claim 1, wherein the communication control device is configured to always insert one of the at least one fields into the frame after a fixed number of bits.

7. The user station as recited in claim 1, wherein the communication control device is configured to insert the at least one field into the frame as a fixed stuff bit, and to insert all fixed stuff bits into the frame according to a fixed bit stuffing rule, according to which a fixed stuff bit is to be inserted after a fixed number of bits.

8. The user station as recited in claim 7, wherein the communication control device is configured to select a value of the at least one field as a function of which value would be selected for the stuff bit to insert an inverse stuff bit into the frame after five identical bits in succession.

9. The user station as recited in claim 1, wherein the communication control device is configured to use the same value for all of the at least one field in the frame.

10. The user station as recited in claim 9, wherein the communication control device is configured to use an even number of M bits for the at least one field, a first half of the M bits in each case having the same first value, and the second half of the M bits in each case having the same second value, which is inverse to the first value.

11. The user station as recited in claim 9, wherein the communication control device is configured to insert into the at least one field at least the least significant bits of a number of fixed stuff bits that are inserted into the frame.

12. The user station as recited in claim 9, wherein the communication control device is configured to insert into the at least one field at least the least significant bits of a number of frames that have been already been transmitted onto the bus from the communication control device.

13. The user station as recited in claim 1, wherein the communication control device is configured to provide a bit after a switchover of the second communication phase into the first communication phase, during which the transceiver device has time to switch over into the second communication phase, and to, when the user station of the bus system receives the frame but is not a sender of the frame, to use the bit to check whether the bit stream of the received frame is shifted by at least one bit compared to the expected frame.

14. The user station as recited in claim 1, wherein the frame that is formed for the message has a configuration that is compatible with CAN FD, and in the first communication phase, it is negotiated which of the user stations of the bus system in a subsequent second communication phase obtains, at least temporarily, exclusive, collision-free access to the bus.

15. A bus system of a vehicle, comprising:
a bus; and
at least two user stations that are connected to one another via the bus so that they can communicate serially with one another, and of which at least one user station is a user station including:
a communication control device to control a communication of the user station with at least one other user station of the bus system, and
a transceiver device to transmit a transmission signal, generated by the communication control device, onto a bus of the bus system, so that for a message that is exchanged between the user stations of the bus system, a bit time of a signal transmitted onto the bus in a first communication phase can differ from a bit time of a signal transmitted in a second communication phase,
wherein the communication control device is configured to generate the transmission signal according to a frame, and to insert into the frame at least one field that is used for checking whether a bit stream of the frame in a user station of the bus system that receives the frame is shifted by at least one bit compared to an expected frame,
wherein the serial bus system uses CAN XL, and
wherein a residual error probability is reduced for a frame that is received from the bus, so that a receiver of the frame can check a check sum, which is a cyclic redundancy check (CRC), at an end of the frame at a correct position, for guaranteeing a detection of a shifted data stream up to an N-bit shift, so as to allow a more reliable transfer of frames via the bus, even in the event of irradiation.

16. A method for communicating in a serial bus system of a vehicle, using a user station that includes a communication control device and a transceiver device, the method comprising:
controlling, via the communication control device, a communication of the user station with at least one other user station of the bus system; and
transmitting, via the transceiver device, a transmission signal, generated by the communication control device, onto a bus of the bus system, so that for a message that is exchanged between user stations of the bus system, a bit time of a signal that is transmitted onto the bus in a first communication phase can differ from a bit time of a signal that is transmitted in a second communication phase, the communication control device generating the transmission signal according to a frame, and inserting into the frame at least one field that is used for checking whether a bit stream of the frame in a user station of the bus system that receives the frame is shifted by at least one bit compared to an expected frame,
wherein the serial bus system uses CAN XL, and
wherein a residual error probability is reduced for a frame that is received from the bus, so that a receiver of the frame can check a check sum, which is a cyclic redundancy check (CRC), at an end of the frame at a correct position, for guaranteeing a detection of a shifted data stream up to an N-bit shift, so as to allow a more reliable transfer of frames via the bus, even in the event of irradiation.

* * * * *